United States Patent [19]
Elson

[11] 3,886,980
[45] June 3, 1975

[54] STEAM HOSE DESIGN

[75] Inventor: Arthur M. Elson, Hamilton Twsp., Mercer County, N.J.

[73] Assignee: Acme-Hamilton Manufacturing Corporation, Trenton, N.J.

[22] Filed: May 21, 1973

[21] Appl. No.: 362,087

[52] U.S. Cl. .............. 138/127; 138/138; 138/143; 138/153
[51] Int. Cl. ............................................ F16l 11/08
[58] Field of Search .......... 138/124, 125, 123, 126, 138/127, 141, 138, 132, 143, 144

[56] References Cited
UNITED STATES PATENTS

| 219,596 | 9/1879 | Perry | 138/127 |
|---|---|---|---|
| 882,292 | 3/1908 | Brown | 138/125 |
| 1,011,090 | 12/1911 | Subers | 138/132 |
| 2,747,616 | 5/1956 | De Ganahl | 138/143 X |
| 2,934,096 | 4/1960 | Banks | 138/125 X |
| 3,166,319 | 1/1965 | Brilhart | 138/143 X |
| 3,177,900 | 4/1965 | Sharp | 138/125 |
| 3,500,867 | 3/1970 | Elson | 138/125 |

*Primary Examiner*—Richard C. Queisser
*Assistant Examiner*—Daniel M. Yasich
*Attorney, Agent, or Firm*—Ostrolenk, Faber, Gerb & Soffen

[57] ABSTRACT

A novel hose design for coupling steam generator sources to steam operated equipment and the like. The hose is provided with at least one layer of wire braid interspersed with flexible resilient layers to withstand high steam pressure. A seamless closed Fiberglas braid inner sleeve is provided in the bore of the hose to restrain rubber particles which may break away from the hose wall from entering the steamline so as to prevent foul-up of delicate mechanisms coupled to the steam hose.

7 Claims, 4 Drawing Figures

STEAM HOSE DESIGN

The present invention relates to a steam hose and more particularly to a novel steam hose design capable of withstanding high temperature and pressure steam carried by the hose and further incorporating means for preventing particles of the steam hose from entering the steamline.

BACKGROUND OF THE INVENTION

There exists a number of applications in which it is advantageous and even required to provide conduits for coupling steam generating sources to steam operated equipment. In a number of such applications the steam hose utilized must be capable of withstanding high temperatures and pressures while giving good serviceablility.

In one specific application, it is a requirement that vessels of the U.S. Navy must have a full head of steam when in port. In order to conserve onboard fuel sources it is typical to provide a large steam generating source at the port facility and couple vessels docking at the port to the steam generating source so as to enable the vessels to have a full head of steam at all times and yet eliminate the need for generating steam on board the vessel. The steam generating source is typically coupled to each vessel by means of a steam hose joined at its respective ends to the steam generating source and a suitable terminal coupling provided on the vessel for coupling the hose to the steam operated equipment. Such hose should be reasonably light in weight, flexible so as to be easily handled and manipulated and capable of withstanding impact and/or cruding due to land vehicles which may ride over the steam hose and further be capable of resuming its normal substantially cylindrical shape after such land vehicles have driven over the hose. The steam hose must further be readily adaptable for coupling to both the steam generating source and the vehicle terminal coupling.

Due to the fact that such steam hose employed in the above mentioned application must be capable of withstanding pressures of up to 250 psi at substantially high steam temperatures, typically of the order of 450° F., the steam hose must be of exceptionally rugged design so as to yield satisfactory serviceability when in use. It has been observed that steam hose exhibits a characteristic commonly referred to as "popcorning" in which the inner steam resistant tubular portion exposed to the steam is caused to blister or pop, even after short periods of usage, enabling elements or particles thereof to break or flake away from the hose and thereby be carried with the steam into the delicate mechanism which comprise the steam operated equipment. This "popcorning" effect has been found to occur in steam hose regardless of the particular composition of steam resistent material employed.

In an effort to overcome this problem and to eliminate rubber particles generated as a result of the "popcorning" effect from entering into the delicate mechanisms of the steam operated equipment, a design has been developed wherein the hose, after fabrication, has inserted therein through its interior opening, a flexible metallic conduit which is forced into the length of hose. This is an extremely tedious and hence expensive approach.

In addition thereto, such steam hose, when utilized at dock facilities, is frequently subjected to being run over by land vehicles, which traverse the docks for servicing and/or supplying vessels docked at the port facilities. The weight of such vehicles causes the steam hose which it may run over to be compressed as the wheels of the land vehicles ride over the steam hose causing substantially permanent flattening of the flexible metallic cable and hence impeding the steam hose from providing the vessels with an adequate supply of steam.

The use of an internal flexible metallic conduit further adds a significant amount of weight to the steam hose so as to increase the problems of handling and manipulation. The flexible metallic cable also significantly reduces the flexibility of the steam hose and hence radius of curvature to which the steam hose may be bent, further complicating handling of the steam hose. Also the nature of the couplings secured to the steam hose, which are normally force fitted into the bore of the hose having a non-metallic bore, requires a welding operation makes it extremely difficult and/or expensive to provide the necessary force-fitted coupling.

Another disadvantage of use of a flexible metallic conduit within the bore of the steam hose resides in the fact that the flexible metallic conduit substantially completely isolates the innermost resilient tube of the hose from the steam causing it to remain dry even when in use. However, the flexible metallic conduit, being a good heat conductor, conducts all of the heat generated by the steam to the tube. This dry heat causes the steam hose to deteriorate at a much more rapid rate than steam hose whose resilient material is directly exposed to the steam and hence the moisture of the steamline.

One proposed technique for preventing rubber particles which break away from the inner surface of the steam hose while eliminating the need for a metallic fixture conduit is the utilization of a wire braid liner provided within the bore of the steam hose. This approach has been found to be extremely disadvantageous due to the significant amount of weight added to the hose, the reduced flexibility and hence significantly increases bending radius of the hose and further the total inability of the hose having such a wire braid interior from being connected to terminal connectors due to its inability to receive and be telescoped upon a force-fitted coupling.

BRIEF DESCRIPTION OF THE INVENTION

The present invention is characterized by providing a novel steam hose design utilizing a closed seamless glass braid interior liner provided in the steam hose bore which eliminates the need for an internal metallic liner so as to yield a steam hose of significantly lighter weight and greater flexibility than conventional steam hose, and hence reduce bending radius thereof while at the same time serving advantageously as a means for preventing rubber particles which result from the "popcorning" effect from entering into the steamline and thereby fouling up the delicate mechanisms of the steam operated equipment.

It is therefore one object of the present invention to provide a novel steam hose design having an extremely lightweight braided liner within the steam hose bore for preventing particles from entering the steamline.

A BRIEF DESCRIPTION OF THE FIGURES

The above as well as other objects of the present invention will become apparent when reading the accompanying description and drawings in which.

DETAILED DESCRIPTION OF THE FIGURES

Figure 1:
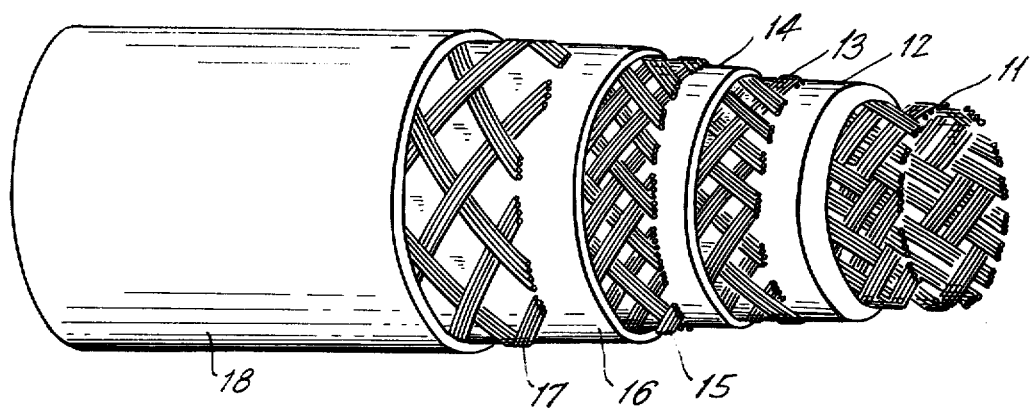
FIG. 1 shows a diagrammatic perspective view of a steam hose embodying the principles of the present invention and in which the layers have been sectionalized in a staggered fashion to expose the structural nature of each layer.
Figure 1A:
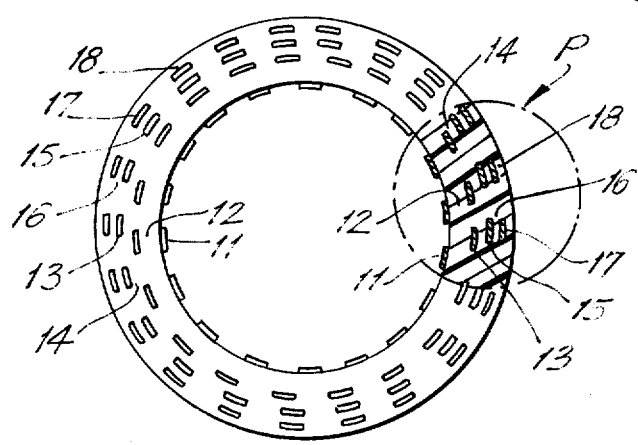
FIG. 1a shows an end view of the steam hose of FIG. 1.
Figure 1B:
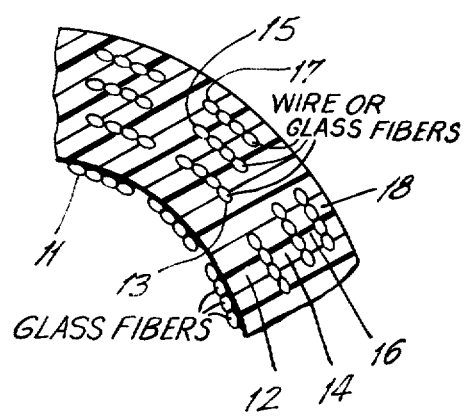
FIG. 1b is an enlarged view of the dotted encircled portion P of the hose cross-section of FIG. 1a showing the braided layers in greater detail.

FIGS. 1, 1a and 1b show a steam hose 10 embodying the principles of the present invention. The hose 10 of FIG. 1 has been sectionalized in a staggered fashion to expose a portion of each layer for purposes of facilitating an understanding of the construction. Also, FIG. 1 shows each layer as being distinct from one another when in fact, and due to the vulcanizing effect, the resilient layers tend to enter into and fill the interstices of the braided layers in the manner shown in FIGS. 1a and 1b. The hose 10 is comprised of a closed seamless inner sleeve 11 formed of a glass braid such as for example a Fiberglas braid. Surrounding the sleeve 11 is a steam resistant seamless tube 12 preferably formed of steam resistant synthetic rubber. A seamless wire braid 13 encircles the steam resistant seamless tube 12 and, in turn, is surrounded by a seamless rubber tube 14. A second sleeve of high tensile strength wire braid 15 encircles rubber tube or layer 14 and in turn, is itself encircled by another layer of rubber forming a tube 16. An open weave Fiberglas breaker or anchor braid 17, in the form of a seamless sleeve, surrounds the layer 16. A final tubular shaped heat resistant cover 18 formed of rubber encircles the open weave Fiberglas breaker braid sleeve 17, the breaker or anchor braid serving to hold and firmly anchor the cover 17 to the hose assembly.

The tube 12 is a seamless heat and steam resistant synthetic rubber tube as are the tubes 14, 16 and 18. The wire braids 13 and 15 are formed of interlaced high tensile strength steel wire in the form of thin strands which collectively form a composite tape-like strand configuration sufficient to withstand working pressures of the order of 250 psi at a 10:1 safety factor. For purposes of simplicity, FIG. 1a shows the braids of each braided layer as being tape-like members having a solid cross-section. FIG. 1b shows an enlarged view of a portion of FIG. 1a showing the individual fibers or wires of each braid.

The method of manufacturing the steam hose is as follows:

The closed weave sleeve 11 is formed by winding braids of glass yarn on an elongated mandrel in a substantially helical fashion so that the braids are woven or interlaced with adjacent braids strands in the manner shown in FIG. 1. After braiding, the mandrel with the closed weave sleeve is run through an extruder means to form the steam resistant seamless tube 12. The mandrel then runs through a wire braiding machine which forms the first seamless wire braid 13 wherein the individual wire elements, which preferably have a tape like cross-sectional configuration as shown best in FIGS. 1a and 1b, are wound about tube 12 in a helical pattern and are further interwoven with adjacent wire strands to form the interlaced woven pattern as shown. The rubber layer 14 is then formed in a manner similar to that of tube 12 with a distinction being that tube 14 is of reduced thickness as compared with tube 12. The second wire braid 15 is then formed upon layer 14 in a manner similar to that of the wire braiding 13.

Another rubber layer 16 is extruded over the second wire braid 15 and an open weave Fiberglas breaker braid 17 is then formed upon layer 16 wherein the individual elongated braids of yarn are wound in a helical pattern and are woven or interlaced with the remaining strips of yarn to form the woven pattern as shown. A seamless heat resistant cover is extruded upon the breaker braid which serves as an anchor to firmly secure the cover to the steam hose assembly.

With the layers formed in the manner set forth hereinabove the steam hose, while still mounted upon the mandrel, is wrapped with a fabric tape which is wound about cover 18 in a helical pattern. The hose is then cured in a vulcanizer which is pressurized with steam preferably at 60 psi to cure the hose. After curing the mandrel is removed and the hose is then ready for use.

Steam hose manufactured in accordance with the above described procedure and embodying the principles of the present invention is quite flexible as compared with hose of conventional design for such steam applications. The hose is typically manufactured to interior diameters in the range from 1 to 3 inches. A hose having an interior diameter of 2 inches, for example, has a bending radius of the order of 15 inches and a weight per hundred foot of approximately 100 lbs.

The hose of FIG. 1 is capable of withstanding rough usage and has a further capability of resuming its normal cylindrical shape even after being run over by land vehicles.

As was described hereinabove, synthetic rubber hose (and especially the seamless tube 12) is caused to blister or split which phenomenon is conventionally referred to as the "popcorning" effect wherein the splitting causes particles or portions of the seamless tube 12 to break away from the body of the tube and to be carried by the steam within the hollow bore into the steam operated mechanisms which will cause foul-up and even serious damage to the delicate mechanisms comprising the steam operated equipment. The closed weave of the Fiberglas braid 11 serves as a barrier or shield to prevent any particles developed as a result of the "popcorning" effect from entering into the hollow bore. In addition thereto the sleeve 11 does not isolate the seamless tube 12 from the steam carried through the bore as is the case with steam hose employing flexible metal conduit which subjects the seamless inner liner tube to dry heat thereby causing the tube to deteriorate at a much more rapid rate than the novel steam hose of the present invention. The extremely lightweight of the glass yarn which forms the sleeve 11 further adds an insignificant amount of weight to the steam hose so as to enhance handling use and bendability of hose of the present design.

As an alternative embodiment for that shown in the figures, the high tensile wire braids 13 and 15 may be replaced by Fiberglas braids which are capable of providing structural strength equivalent to that provided by the wire braids 13 and 15 while at the same time significantly reducing the overall weight of the hose and increasing its bending radius. The substituted Fiberglas braiding is otherwise formed in the same manner as that described hereinabove in connection with the high tensile wire braid.

Figure 2:
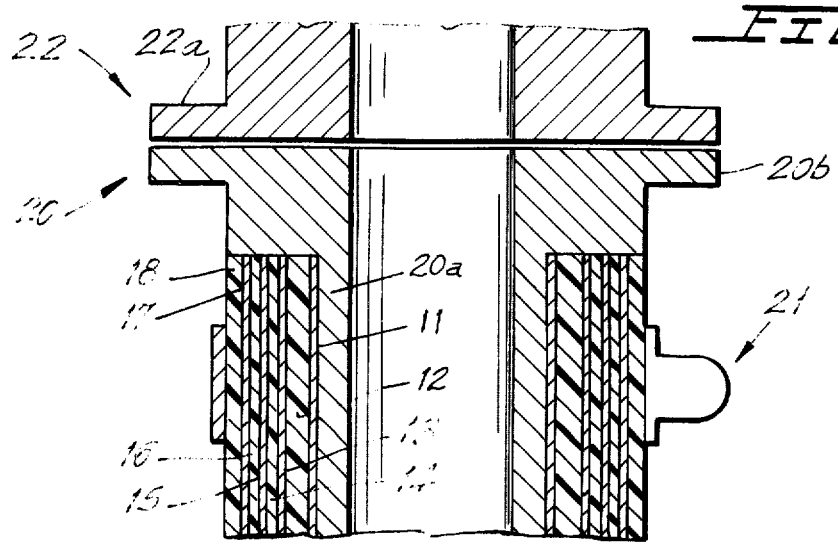
FIG. 2 shows a diagrammatic view of the hose of FIGS. 1 and 1a having a force-fitted coupling.

FIG. 2 shows a cross-sectional view of the present invention and the manner in which it force fittingly receives a coupling 20. The coupling 20 has a cylindrical shaped portion 20a which is forced into the bore of the steam hose 10. A metal clamping ring assembly 21 is then positioned about the cover 18 so as to tightly secure the end of the steam hose to coupler 20. The flange 20b of coupler 20 may in turn be secured to a mating coupler 22 of a similar configuration which may employ any suitable type of fastening means. One distinct advantage of the present invention resides in the fact that force fitting operations may be done in a rather simple and straight forward manner as compared with steam hose having an internal wire braid since the wire braid will not give and it has therefore been found to be impossible to force fit the coupling into the hose. The hose employing a flexible metallic conduit within the internal bore has been found to require that the coupling member be welded thereto whereas the design of the present invention totally eliminates the need for a welding operation and the other attendant disadvantages.

The steam hose of the present invention has been tested in the marine applications described hereinabove and has been found to yield a life span which is double that of conventional hose. Minimum usable time requirements for steam hose set by the United States Navy are of the order of 90 days. The steam hose design embodying the principles of the present invention have been found to be usable after periods of 120 days which is not heretofore been capable of being achieved through hose of conventional design.

It can therefore be seen that the present invention provides a steam hose of novel design which has increased flexibility, reduced weight and high serviceablility not heretofore capable of being obtained through conventional hose while at the same time providing a light-weight and yet highly effective barrier which prevents particles, which result from bursting or cracking of the rubber tube, from entering into the steamline so as to protect the delicate mechanisms of the steam operated equipment.

Although the present invention has been described in connection with a preferred embodiment thereof, many variations and modifications will now become apparent to those skilled in the art. It is preferred, therefore, that the present invention be limited not by the specific disclosure herein, but only the the appended claims.

What is claimed is:

1. For use in coupling a steam generating source to steam operated equipment, a relatively light weight flexible cylindrical shaped hose assembly for conveying steam at pressures in excess of 150 psi said hose assembly comprising:
a seamless lightweight braided inner sleeve;
a first seamless tubular layer of steam resistant resilient material surrounding said inner sleeve;
a second seamless braided intermediate sleeve surrounding said first tubular layer and having braids formed of a plurality of wire strands collectively adapted to withstand the high pressures developed within the bore of the hose assembly and to enhance the ability of the hose assembly to retain its normal cylindrical shape;
a second seamless steam heat resistant tubular cover layer formed of a resilient material and surrounding said intermediate sleeve;
said inner sleeve being affixed to the inner surface of said first seamless tubular layer and defining the inner wall of the hose assembly, said inner sleeve comprising braided strands of steam and heat resistant glass yarn interlaced to form a closed woven sleeve exposed to the steam passing through the bore of the hose assembly for preventing particles which may break away from said first seamless tubular layer from entering into the flow of steam passing through said bore.

2. The hose assembly of claim 1 wherein the wire strands of said intermediate sleeve are formed of high tensile steel.

3. The hose assembly of claim 1 wherein the strands of said second sleeve are each wound in a helical pattern to form a tubular sleeve and are interlaced with one another to collectively form said braided sleeve.

4. The hose assembly of claim 1 wherein said first and second seamlesss tubular layers are formed of heat resistant synthetic rubber.

5. For use in coupling a steam generating source to steam operated equipment, a flexible cylindrical shaped assembly for conveying steam at pressures in excess of 150 psi, said hose assembly comprising:
a seamless lightweight braided inner sleeve;
a first tubular layer of steam resistant resilient material surrounding said inner sleeve;
a second seamless braided sleeve surrounding said first tubular layer and having braids formed of a plurality of strands collectively adapted to withstand the high pressures developed within the bore of the hose assembly and to enhance the ability of the hose assembly to retain its normal cylindrical shape;
a second seamless steam heat resistant tubular layer formed of a resilient material and surrounding said second braided sleeve;
a third seamless braided sleeve surrounding about said second tubular resilient layer and being formed of interlaced strands collectively capable of withstanding the high pressures developed within the bore of the hose and cooperating with said second braided sleeve to enhance the ability of the hose to retain its normal cylindrical shape;
a third resilient tubular layer surrounding said third seamless braided sleeve;
a fourth seamless braided open weave anchor sleeve surrounding said third tubular layer;
a fourth resilient tubular cover layer surrounding said anchor sleeve, said anchor sleeve enhancing the securement of the cover layer to said third tubular layer;
said inner sleeve being affixed to the inner surface of said first tubular layer and defining the inner wall of the hose assembly, said inner sleeve comprising braided strands of steam and heat resistant glass yarn formed a closed woven sleeve exposed to the steam passing through the bore of the hose assembly for preventing particles which may break away from said first tubular layer from entering into the flow of steam passing through said bore.

6. The hose assembly of claim 5 wherein the strands of said fourth sleeve are formed of glass yarn.

7. The hose assembly of claim 5 wherein the strands of said second and third sleeves are each formed of high tensile strength steel wire.

* * * * *